United States Patent
Saburi

(10) Patent No.: US 6,556,235 B1
(45) Date of Patent: Apr. 29, 2003

(54) PORTABLE VIDEOPHONE UNIT

(75) Inventor: Kazumi Saburi, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/571,716

(22) Filed: May 15, 2000

(30) Foreign Application Priority Data

May 17, 1999 (JP) .......................................... 11-136401

(51) Int. Cl.$^7$ ................................................ H04N 7/14
(52) U.S. Cl. ............................... 348/14.02; 348/14.01; 379/102.01; 455/566
(58) Field of Search ........................... 348/14.01, 14.02, 348/14.03, 14.04, 14.05, 14.06, 14.08; 379/102.01, 102.02, 102.03, 93.02, 93.03; 455/556, 557, 575, 566; H04N 7/14

(56) References Cited

U.S. PATENT DOCUMENTS

| | | | | |
|---|---|---|---|---|
| 6,069,648 A | * | 5/2000 | Suso et al. ................ | 348/14.02 |
| 6,298,122 B1 | * | 10/2001 | Horne ...................... | 379/93.09 |

FOREIGN PATENT DOCUMENTS

| | | | | |
|---|---|---|---|---|
| EP | 0-869-464 | 10/1998 | | |
| GB | 2-280-822 | 2/1995 | | |
| GB | 2-324-675 | 10/1998 | | |
| JP | 403076475 A | * 4/1991 | .......... | H04N/5/225 |
| JP | 406296206 A | * 10/1994 | ............ | H04N/1/00 |
| JP | 408032945 A | * 2/1996 | ............ | H04N/7/14 |
| JP | 2000-013529 | 1/2000 | | |

* cited by examiner

Primary Examiner—Melur Ramakrishnaiah
(74) Attorney, Agent, or Firm—Hogan & Hartson, LLP

(57) ABSTRACT

The object is to realize an automatic response to an incoming call and two-way communication using at least images. In a memory (2), a personal identification number for identifying opposite party who is permitted to have communication in an automatic response mode and mode information, which indicates whether or not the automatic response mode is activated, are stored. Upon detection of an incoming call, the central processing unit first judges whether or not the automatic response mode is activated (S2). If the result of the judgement is "yes", a personal identification number in the calling data received is compared with the personal identification number stored in the memory (2) (S4). As a result, if the personal identification numbers are the same, the unit automatically responds to the incoming call, and two-way communication using images and sound can be carried out (S5). On the other hand, if the automatic response mode is not activated, or if the personal identification number has not been input or is not the same as the personal identification number stored, a normal response is performed (S3).

2 Claims, 6 Drawing Sheets

PORTABLE VIDEOPHONE UNIT

BACKGROUND OF THE INVENTION

1. Field of the Invention

The present invention relates to a portable videophone unit which has a camera and a monitor, and which can transmit and receive images and sound using a wireless public network.

2. Description of Related Art

Portable videophone units have been hitherto known which have a camera and a monitor as input and output parts for images and a microphone and a speaker as input and output parts for sound, and which encode images and sound input by the camera and the microphone, respectively, and transmit the encoded images and sound to an opposite party via a public network while receiving encoded images and sound sent by the opposite party and decoding them into images, which are displayed by the monitor, and sound, which is output from the speaker, whereby the user can have a conversation while seeing images from the opposite party.

On the other hand, as automatic response functions of telephone sets, the following have hitherto been known.

(1) A function of a portable telephone unit by which when an incoming call is detected, the portable telephone unit automatically proceeds to an off-hook status and receives a message sent by the opposite party.

(2) A function by which the telephone set automatically responds to the calling party on behalf of the user and records a message when the user is not by the telephone or the user cannot answer the telephone, such as when the user is having a meal at a quiet restaurant, when the user is in a concert hall, or when the user is attending an important meeting. (so called "answering system")

(3) A function, which is often found on automobile telephone sets, by which when an incoming signal is detected, the telephone set automatically receives the signal, and communication between two parties is made possible.

According to this function, the telephone set proceeds to an off-hook status without the user touching it, and conversation during driving is made possible.

(4) A basic function of facsimile machines, by which when an incoming signal is detected, the telephone line is connected to receive data.

However, none of the above functions realizes smooth two-way communication using images and sound after automatic response.

Moreover, for conventional automatic response functions there is a premise that the telephone set responds to all incoming calls from unspecified general calling parties, and such conventional automatic response functions cannot satisfy users' desire to permit automatic response only to incoming calls from particular calling parties.

BRIEF SUMMARY OF THE INVENTION

If portable videophone units are provided with a function by which a recipient party's unit can be remotely controlled by a calling party's unit, not only smooth two-way communication using images is made possible but also complicated operations of the recipient party's unit can be carried out by the calling party, even if the recipient party is not accustomed to complicated operations of the portable videophone unit.

In addition, portable videophone units provided with such a function could be used for surveillance purposes.

The present invention was accomplished in view of the above circumstances. An object of the present invention is to provide a portable videophone unit which makes smooth two-way communication possible even with an opposite party who is not accustomed to the operation of portable videophone unit, which automatically responds to an incoming call from a particular calling party to permit two-way communication, and which makes remote control of a recipient party's unit by a calling party's unit possible.

In order to achieve the above object, a portable videophone unit according to the present invention comprises an image display section which displays images, a data transmitting-receiving section which transmits image data and sound data to an opposite party's unit and receives image data and sound data from the opposite party's unit, and a control section which automatically responds to an incoming call from the opposite party's unit to allow the transmitting-receiving section to transmit and receive at least the image data.

According to this constitution, the portable videophone unit automatically responds to an incoming call from an opposite party's unit and can carry out two-way communication by transmitting and receiving at least images, and therefore two-way communication using images can be carried out smoothly even if the recipient party is not accustomed to the operation of this type of portable videophone unit.

The portable videophone unit of the present invention may further comprise an information storage section which stores information for identifying a particular party and a judging section which judges whether or not an incoming call is from the particular party by comparing data received at the time of receiving the incoming call with the information stored in the information storage section, wherein the control section permits the data transmitting-receiving section to transmit and receive data only when the judging section judges that the incoming call is from the particular party.

According to this constitution, two-way communication by automatic response can be carried out selectively in response to an incoming call from a particular calling party. Therefore, the security of the recipient party can be ensured.

Here, the information for identifying a particular party is the calling party's telephone number or personal identification number or both types of numbers.

The portable videophone unit of the present invention may comprise an image display section which displays images, a data transmitting-receiving section which transmits image data and sound data to an opposite party's unit and receives image data and sound data from the opposite party's unit, an information storage section which stores information for identifying a particular party, a judging section which judges whether or not an incoming call is from the particular party by comparing data received when detecting the incoming call with the information stored in the information storage section, and a control section which permits the portable videophone unit to accept remote control by the opposite party when the judging section judges that the incoming call is from the particular party.

According to this constitution, not only smooth two-way communication using images is made possible, but also complicated operations of the recipient party's unit can be carried out by the calling party, even if the recipient party is not accustomed to the operation of this type of portable videophone unit.

In addition, portable videophone units can be used as a surveillance system.

Here, the information for identifying a particular party is calling party's telephone number or personal identification number or both types of numbers.

DETAILED DESCRIPTION OF THE INVENTION

In the following, embodiments of the present invention are described with reference to the drawings.

Figure 1:
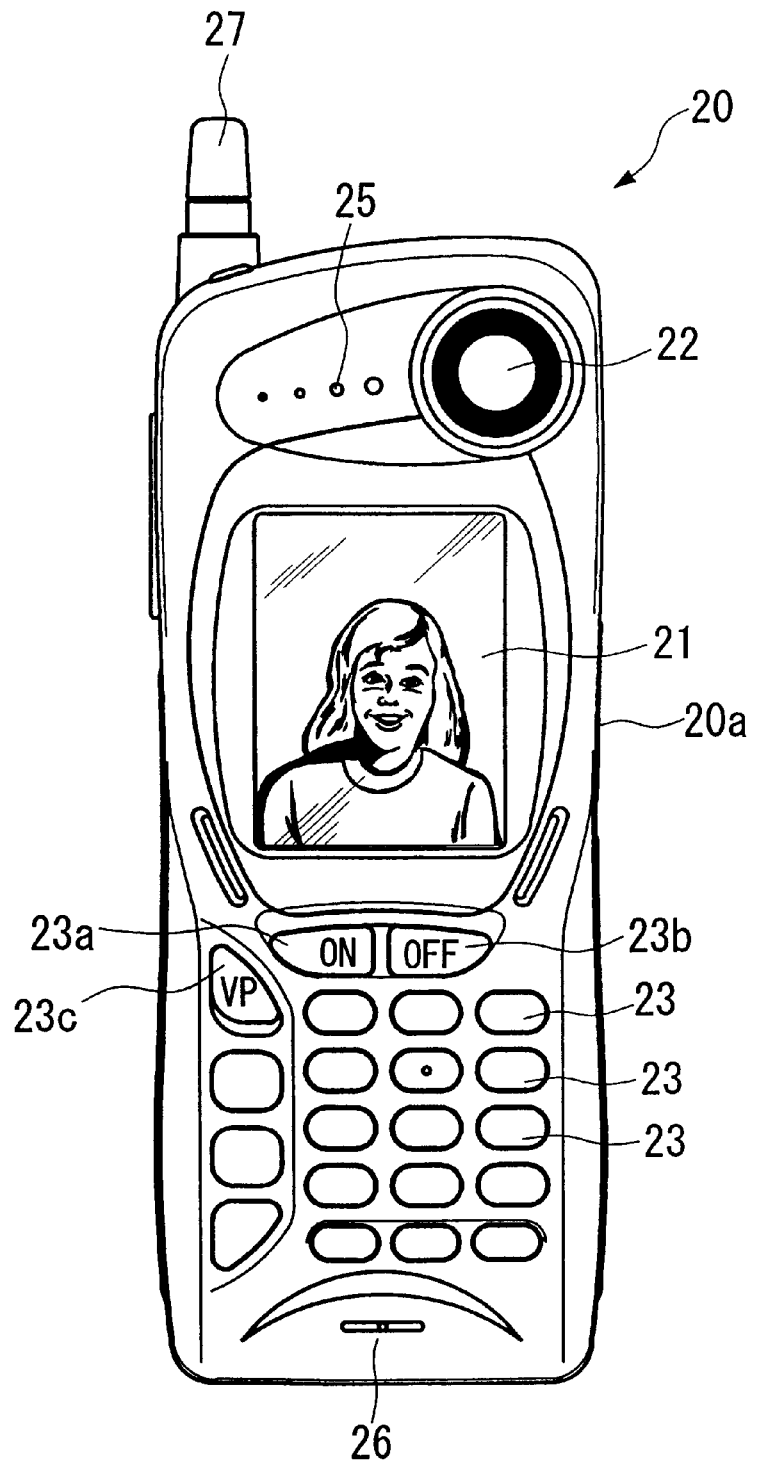
FIG. 1 is a front view of a portable videophone unit according to the first embodiment of the present invention.
Figure 2:
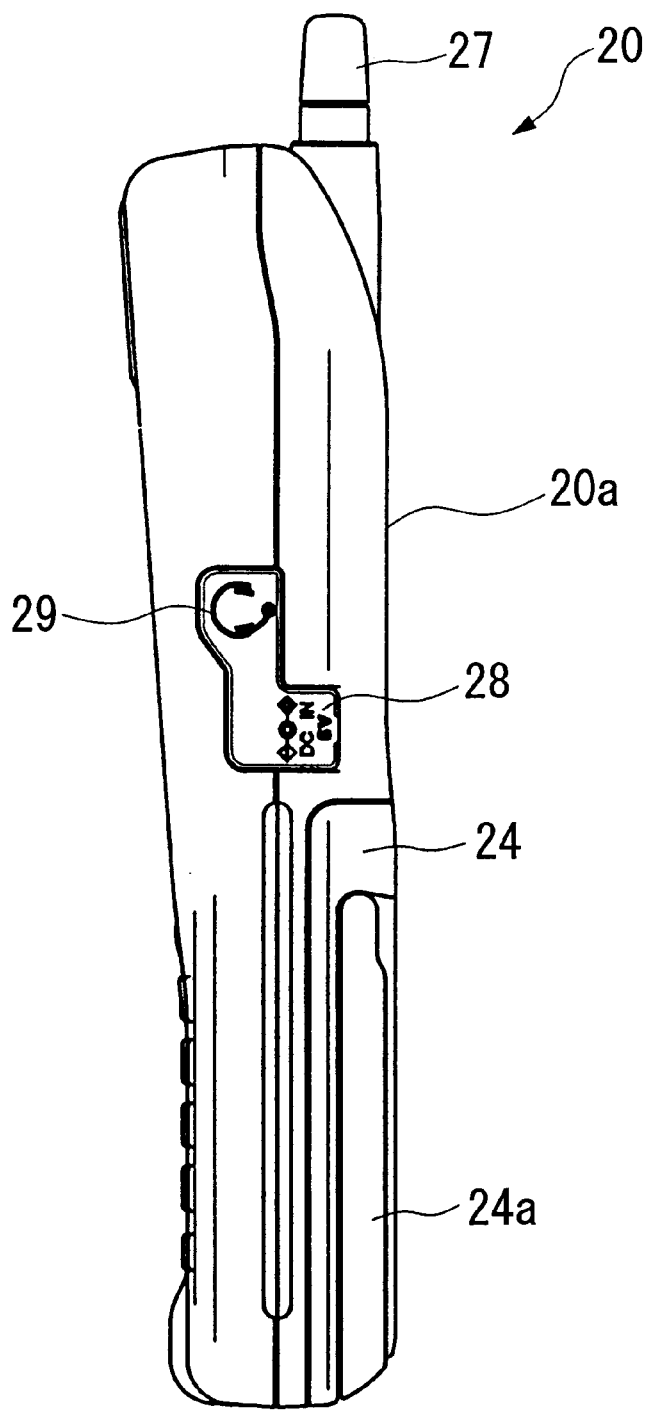
FIG. 2 is a right side view of the portable videophone unit.
Figure 3:
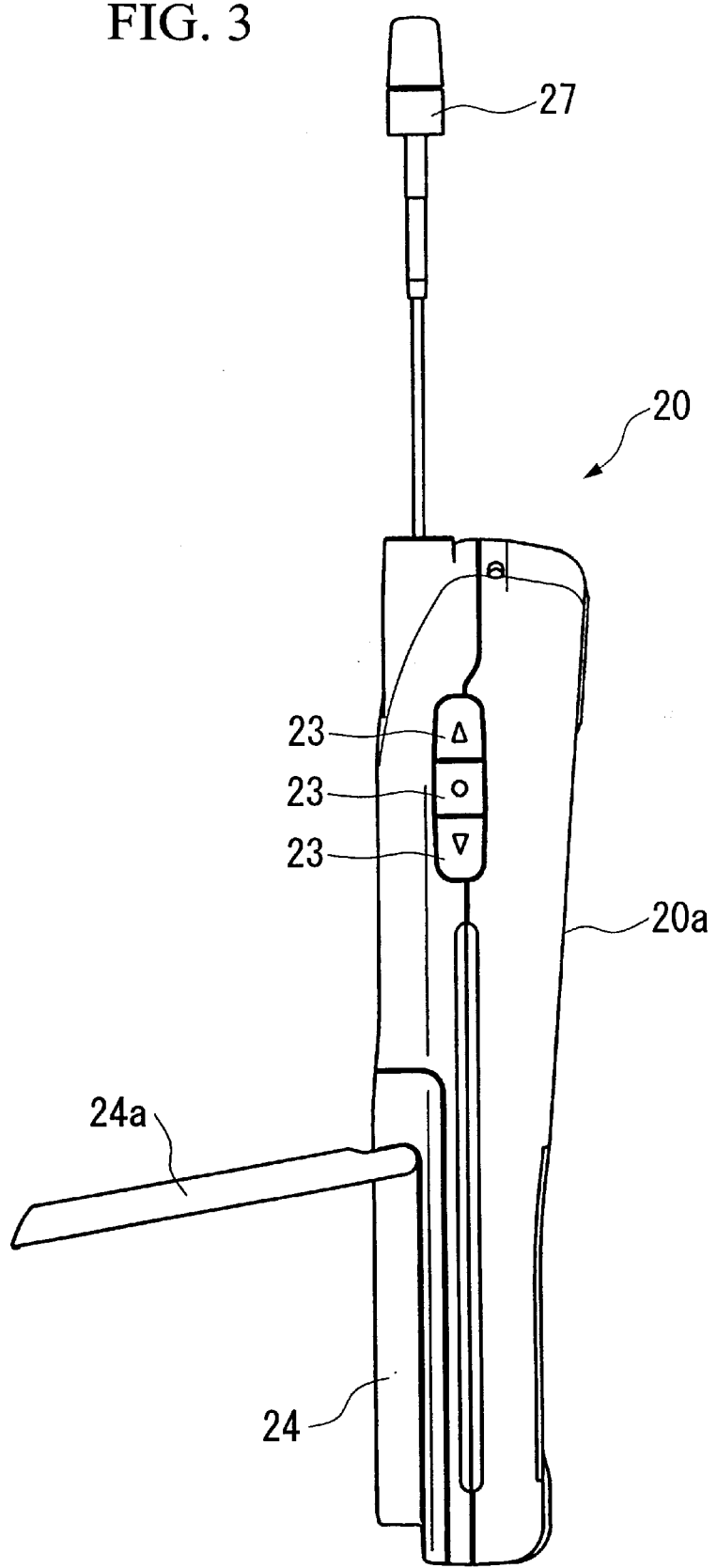
FIG. 3 is a left side view showing the portable videophone unit.

FIG. 1 is a front view of a portable videophone unit according to a first embodiment of the present invention. FIGS. 2 and 3 are sides views of the portable videophone unit shown in FIG. 1.

As shown in FIGS. 1 to 3, the portable videophone unit 20 has a display (image display section) 21 comprising a liquid crystal panel in the front face of the main body 20a of the portable videophone unit 20.

The display 21 is able to display the information related to communication functions of the portable telephone unit, such as a telephone number and a pictograph indicating the strength of the electric field, and/or visual information.

The unit main body 20a is provided with a camera 22 on the front side of the upper portion thereof. Images are taken by this camera 22.

There are a plurality of keys used for operation provided below the display 21. Various operations can be carried out by pressing these keys 23.

For example, keys 23a and 23b are hook switches; when the key 23a is pressed, the portable videophone unit proceeds to an off-hook status, and when the key 23b is pressed down, the portable videophone unit proceeds to an on-hook status.

In addition, key 23c is a switch for switching communication modes. By pressing the key 23c, the communication modes can be switched to one of the sound mode (communication by sound only), the image mode (communication by images only), and the VP mode (communication by sound and images).

Furthermore, another key 23 for setting up an automatic response mode is also provided.

The unit main body 20a is provided with a speaker 25 in the upper portion thereof to one side of the camera 22. The unit main body 20a is provided with a microphone 26 in the lower portion thereof. The microphone 26 carries out the sound input, and the speaker 25 produces the voice of the opposite party, a ringing sound, an alarm, and so on.

At the upper end of the unit main body 20a, a retractable antenna 27 is provided. A built-in radio section (data transmitting-receiving section), which is not shown in FIGS. 1 to 3, carries out communication using image data and sound data via the antenna 27.

On the side of the unit main body 20a, opposite to the antenna 27, an external power source connecting section 28 to be connected to an alternating current power source such as an electric outlet through an adapter, and an external sound outlet to which an earphone or the like is connected are provided.

The unit main body 20a is provided with a battery cover 24 on the back side thereof, which is attached to and detached from a housing section which houses a battery. To this battery cover 24, a stand 24a is linked in a manner such that it is rotatable within a particular range of angles.

By rotating the stand 24a so as to increase the angle of the stand 24a, the unit main body 20 can be supported in a slanted state with respect to the surface on which the unit main body 20 is set up.

The operation of the keys when making an outgoing call is practiced normally by pressing the keys 23 to input the telephone number of the opposite party, and thereafter pressing the key 23a to proceed to an off-hook status. The operation of the keys when receiving an incoming call is practiced normally by pressing the key 23a in response to ringing or a vibration alert of an incoming call so as to proceed to an off-hook status. However, with the portable videophone unit 20 according to this embodiment, by inputting a predetermined personal identification number after inputting the telephone number of the opposite party, the portable videophone unit 20 of the opposite party automatically responds to the call, and two-way communication using images and sound is permitted.

Next, functions and actions of the portable videophone unit 20 according to this embodiment will be described with reference to FIG. 4.

Figure 4:
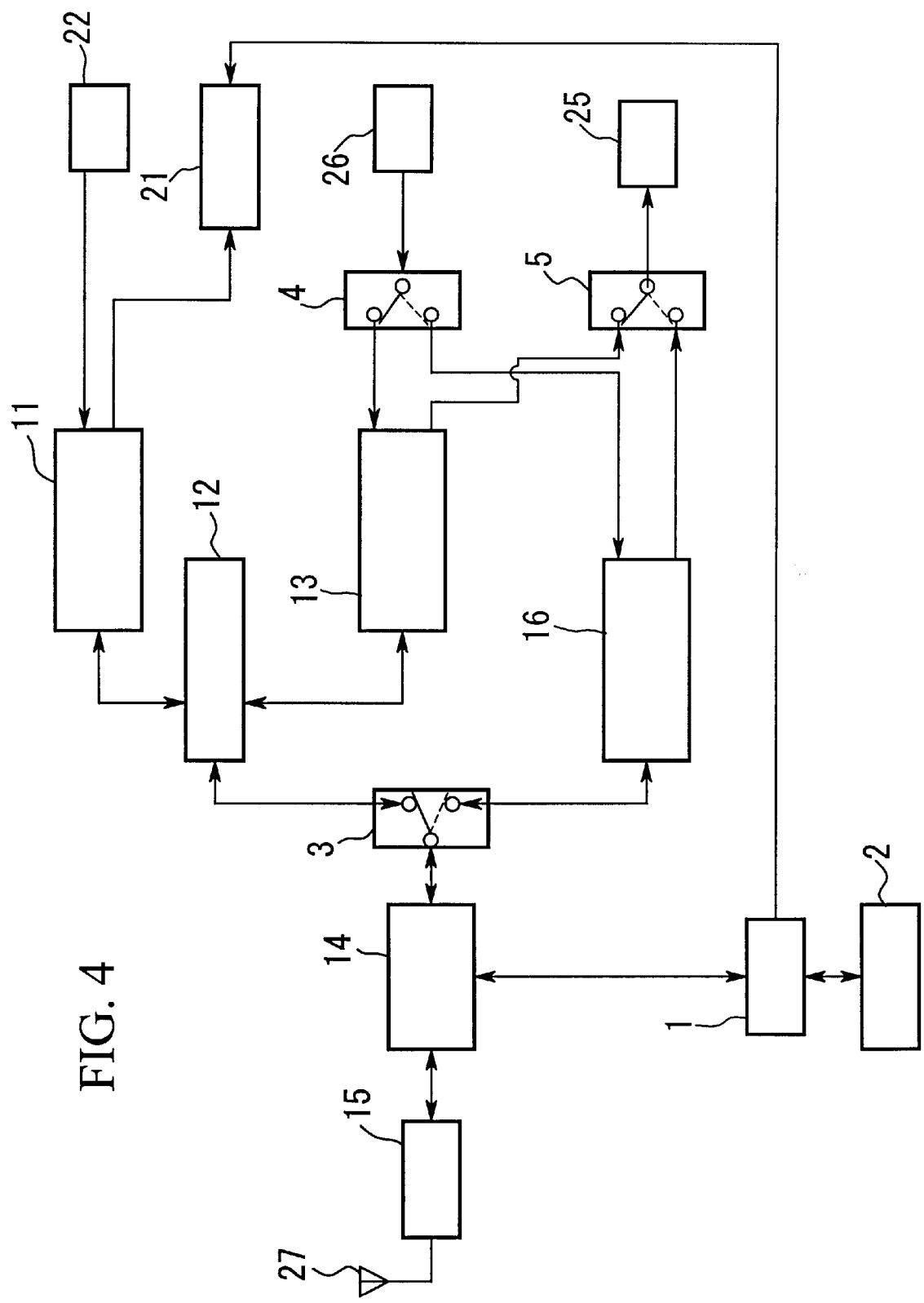
FIG. 4 is a functional block diagram of the portable videophone unit.

In FIG. 4, numeral 1 indicates a central processing unit (control section) which controls the entire unit, and numeral 52 indicates a memory (information storage section) for storing various data.

In this memory 2, information for identifying the opposite party who is permitted to have communication in an automatic response mode (the information hereinafter referred to as "personal identification number") and image data which are externally input as well as control programs are stored.

First, transmission and receipt of images and sound conducted after the connection of the telephone line will be described below. Communication modes of this portable videophone unit 20 are switchable in three stage, that is, to the sound mode (communication by sound only), to the image mode (communication by images only), and to the VP mode (communication by sound and images) as described above corresponding to the positions of the switches 3, 4, and 5 which are driven by pressing the key 23c.

[VP Mode]

When the communication mode is set to the VP mode, all the switches 3, 4, and 5 are placed in the positions indicated by solid lines in FIG. 4.

Images taken by the camera 22 are encoded by an image codec 11, and sent to a multiplexing/separating section 12.

On the other hand, sound input by the microphone 26 is sent to a sound codec 13 via the switch 4, where the sound is encoded and sent to the multiplexing/separating section 12.

The multiplexing/separating section 12 multiplexes the image data from the image codec 11 and the sound codec 13 for image communication.

The multiplexed data formed by multiplexing the image data and the sound data are sent to a time-division multiplex circuit 14 via the switch 3, and transmitted from the antenna 27 via the radio section 15.

On the other hand, when the portable videophone unit 20 of the opposite party receives the multiplexed data by the antenna 27, these multiplexed data are sent to the multiplexing/separating section 12 via the radio section 15, the time-division multiplex circuit 14, and the switch 3, where the data are separated into image data and sound data.

The separated imaged data are decoded by the image codec 11, and the images are displayed by the display 21.

In addition, the separated sound data are decoded by the sound codec 13 for image communication, and the sound is produced by the speaker 25.

[Sound Mode]

When the communication mode is set to the sound mode, all the switches 3, 4, and 5 are placed in the positions indicated by broken lines in FIG. 4.

Sound input by the microphone 26 is sent to a sound codec for sound communication via the switch 4 and encoded, and then transmitted from the antenna via the switch 3, the time-division multiplex circuit 14, and the radio section 15.

On the other hand, when the portable videophone unit 20 of the opposite party receives the sound data by the antenna 27, these sound data are sent to the sound codec 16 for sound communication via the radio section 15, the time-division multiplex circuit 14, and the switch 3, where the data are decoded, and the sound is produced by the speaker 25.

[Image Mode]

When the communication mode is set to the image mode, only the switch 4 is placed in the position indicated by the broken line in FIG. 4.

Images taken by.the camera 22 are encoded by the image codec 11, and transmitted from the antenna 27 via the multiplexing/separating section 12, the switch 3, the time-division multiplex circuit 14, and the radio section 15.

On the other hand, when the portable videophone unit 20 of the opposite party receives the image data by the antenna 27, these image data are sent to the image codec 11 via the radio section 15, the time-division multiplex circuit 14, the switch 3, and the multiplexing/separating section 12, where the data are decoded, and the images are displayed by the display 21.

[Transmission and Receipt of Calls]

The calling party makes a call normally by pressing the keys 23 to input the telephone number of the opposite party, and then pressing the key 23a. However, in order to make the portable videophone unit 20 of the opposite party automatically respond to the call and to carry out two-way communication using images and sound, a personal identification number is required to be input by the keys after the telephone number of the opposite party is input.

Figure 5:
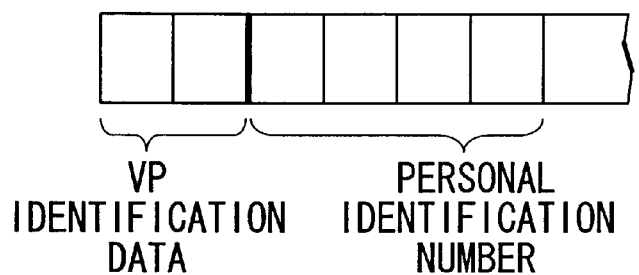
FIG. 5 shows a part of the outgoing call data transmitted by the portable videophone unit.

Then, the portable videophone unit 20 of the calling party transmits calling data containing VP identification data, which indicate that the communication mode is the VP mode, and the personal identification number input by the keys as well as the telephone number of the opposite party (see FIG. 5).

These calling data are input into the central processing unit 1 of the portable videophone unit 20 of the opposite party via the antenna 27, the radio section 15, and the time-division multiplex circuit 14.

Figure 6:
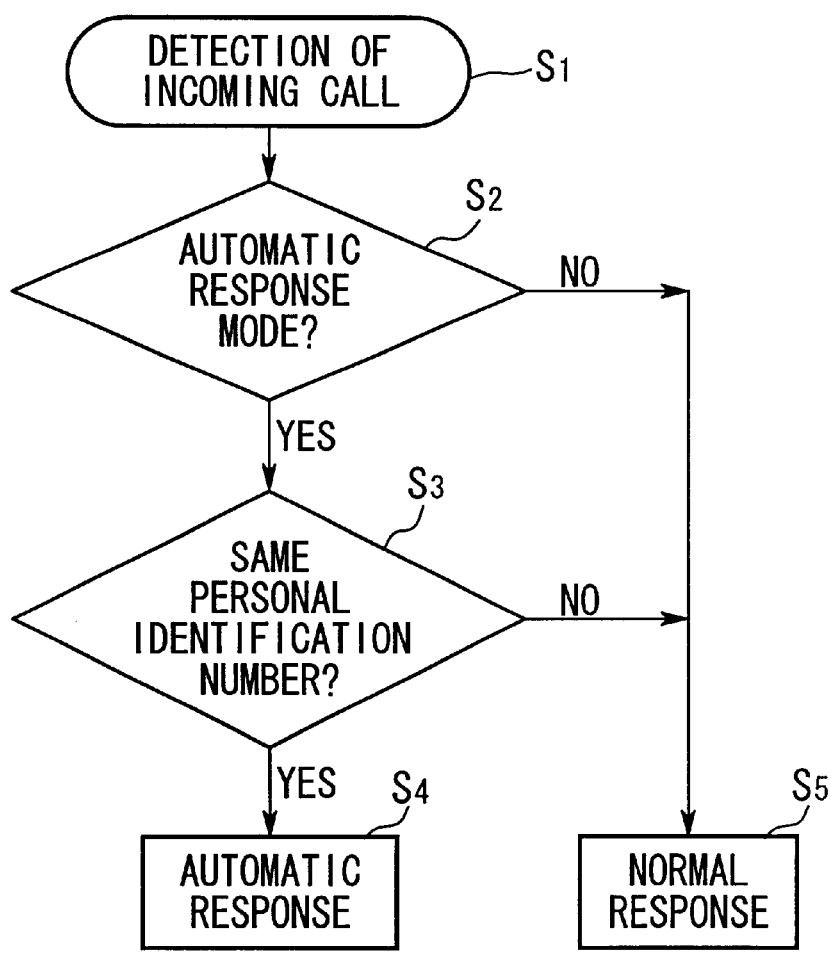
FIG. 6 is a flow chart showing a flow of processes carried out when detecting an incoming call by a central processing unit in the portable videophone unit.

By the central processing unit 1, the processes shown in FIG. 6 are carried out.

In FIG. 6, the "automatic response" mode means a response mode in which when an incoming call from a particular opposite party who is permitted to have communication in an automatic response mode, the portable videophone unit 20 proceeds to an off-hook status without the key 23a being pressed down, and two-way communication in the VP mode is made possible.

On the other hand, the "normal response" mode means a response mode in which two-way communication is not permitted when an incoming call from the opposite party is detected, unless the key 23a is pressed down.

These modes are switchable from one to another by pressing the keys 23. In the memory 2, mode information as to whether or not the "automatic response" mode is activated is stored.

When the central processing unit 1 detects an incoming call (step S1), it judges whether or not the automatic response mode is activated by a key operation (step S2).

This judgement is performed based on the mode information stored in the memory 2.

If the result of the judgement in step S2 is "no", that is, if the automatic response mode is not activated, the processing proceeds to step S3, where processing for a normal-response is carried out.

In contrast, if the result of the judgement in step S2 is "yes", that is, if the automatic response mode is activated, authentication of the calling party is performed (step S4).

The authentication is performed by checking whether the personal identification number in the calling data, which is received by a judging section (not shown) inside the central processing unit 1, is the same as the personal identification number stored in the memory 2 in advance.

In the case where plural sets of personal identification numbers are stored in the memory 2, judgement is performed with respect to the all sets of personal identification numbers.

If the result of the judgement in step S4 is "no", that is, if the calling party has not input the personal identification number, or if the calling party has input wrong personal identification number, the processing proceeds to step S3, where processing for a normal response is carried out.

On the other hand, if the result of the judgement in step S4 is "yes", that is, if the calling party has input correct personal identification number, the central processing unit 1 decides that the incoming call is from a party who is permitted to have communication in an automatic response, mode, and the processing proceeds to step S5, where processing for communication in an automatic response mode is carried out.

In step S5, whether the key 23a is pressed or not, the central processing unit 1 generates an off-hook status so as to connect the telephone line to make two-way communication in the VP mode possible.

At this time, if the communication mode of the unit of the recipient party is set to the sound mode or the image mode, control signals from the central processing unit 1 operate switches 3, 4, and 5 to automatically switch the communication mode to the VP mode.

As described above, since the portable videophone unit 20 of this embodiment automatically responds to an incoming call from the portable videophone unit of the opposite party and makes two-way communication using images and sound possible, smooth two-way communication using images and sound can be carried out, and the operability and the usability are improved.

In addition, since communication in an automatic response mode is selectively permitted to incoming calls from a specific calling party, when an incoming call is detected from somebody who is not acquainted with or who is not well-known to the recipient, the security of the recipient party can be maintained, and privacy of the recipient party can be kept from being freely viewed.

Naturally, communication in an automatic response mode would not be initiated if the power of the unit has been turned off.

Next, a second embodiment of the present invention will be described.

A portable videophone unit 20 of the second embodiment is characterized in that it can accept remote control by another portable videophone unit 20 of a calling party. Basic functions and actions of this videophone unit 20 are similar to those of the portable videophone unit 20 of the first embodiment.

Accordingly, the same reference numerals are used below, and only the differences are described.

In the memory 2, a personal identification number for identifying a party who is permitted to remotely control the portable videophone unit 20 in which this memory 2 is installed is stored.

The judgement section of the central processing unit 1 judges whether or not the personal identification number stored is the same as the personal identification number in the calling data received. If the identification numbers are in agreement, remote control by the calling party is accepted.

Figure 7:
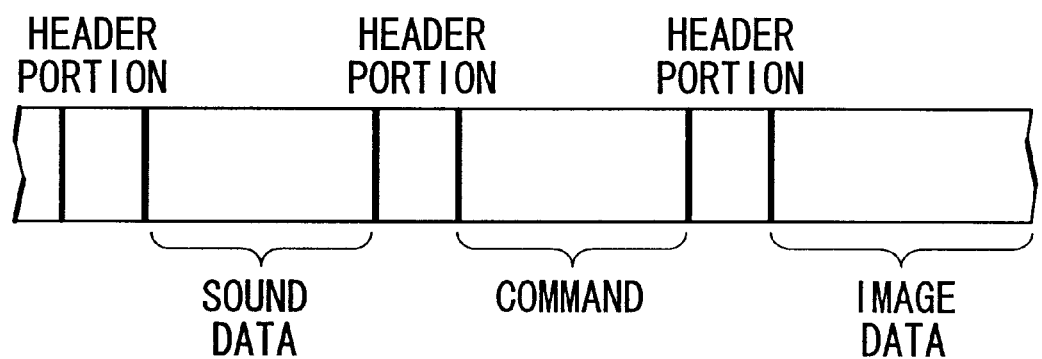
FIG. 7 shows a data sequence transmitted by a portable videophone unit according to the second embodiment of the present invention.

Specifically, as shown in FIG. 7, the data transmitted from the portable videophone unit 20 of the calling party contains control commands for remote control in addition to the sound data and the image data.

The central processing unit 1 identifies the type of data (sound, image, command, and so on) by the header portion of the data. If the header portion indicates that the following data are control commands for remote control, the central processing unit 1 executes the control commands.

As described above, the portable videophone unit 20 of this embodiment not only executes control commands in accordance with key operations or control programs stored in the memory, but also executes control commands for remote control which are transmitted with image data and sound data by the portable videophone unit 20 of the calling party. Accordingly, even if the recipient party is not accustomed to the operation of the portable videophone unit, not only smooth two-way communication using images is made possible, but also complicated operations of the recipient party's unit can be carried out by the calling party, and two-way communication can be carried out making the most of the functions of the portable videophone unit 20.

In addition, the portable videophone units 20 can be used as a surveillance system.

In the above embodiments, permission of automatic response and remote control was dependent exclusively on the personal identification number. However, in order to enhance security and in order to identify the calling party, the telephone number of the calling party may also be used as a criterion for judging permissibility of automatic response and remote control. Such a use of a telephone number has been known, and a description thereof is omitted here.

As is clear from the above description, the present invention can bring about the following effects.

(a) Since the portable videophone unit according to the present invention automatically responds to an incoming call from the portable videophone unit of the opposite party and makes two-way communication using at least images possible, smooth two-way communication using images can be carried out even if the user is a child or an aged person who is not accustomed to the operation and who is not very good at complicated operations of such a portable videophone unit, and the operability and the usability are improved.

(b) Since communication in an automatic response mode is selectively permitted to incoming calls from a specific calling party, when an incoming call is detected from somebody who is not acquainted with or who is not well-known to the recipient, the security of the recipient party can be maintained, and privacy of the recipient party can be kept from being freely viewed.

(c) Since the portable videophone can execute control commands for remote control which are transmitted with image data and sound data by the portable videophone unit of the calling party, even if the recipient party is not accustomed to the operation of the portable videophone unit, not only smooth two-way communication is made possible, but also complicated operations of the recipient party's unit can be carried out by the calling party, and two-way communication can be carried out making the most of the functions of the portable videophone unit.

In addition, the portable videophone units can be used as a surveillance system.

What is claimed is:

1. A portable videophone unit comprising an image display section which displays images, a data transmitting-receiving section which transmits image data and sound data to an opposite part's unit and receives image data and sound data from the opposite party's unit, an information storage section which stores information for identifying a particular party, a judging section which judges whether or not an incoming call is from the particular party by comparing data received at the time of receiving the incoming call with the information stored in the information storage section, and a control section which permits the portable videophone unit to accept remote control of two-way communication by the opposite party when the judging section judges that the incoming call is from the particular party.

2. A portable videophone unit according to claim 1, wherein the information for identifying a particular party is a calling party's telephone number or personal identification number or both types of numbers.

* * * * *